Sept. 10, 1968   K. J. CLEEREMAN ETAL   3,401,071
METHOD FOR PLASTIC FILM ENCAPSULATION Filed Nov. 5, 1962                          2 Sheets-Sheet 1

INVENTORS.
Kenneth J. Cleereman
BY Donald J. Dirkse

ATTORNEY

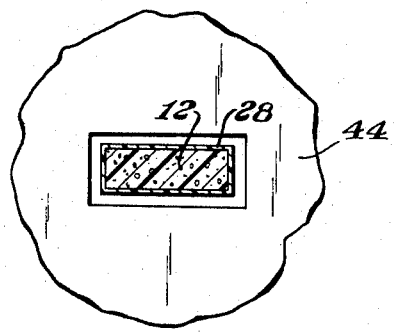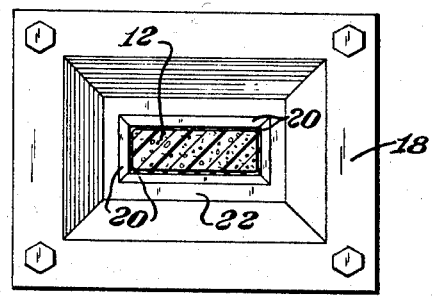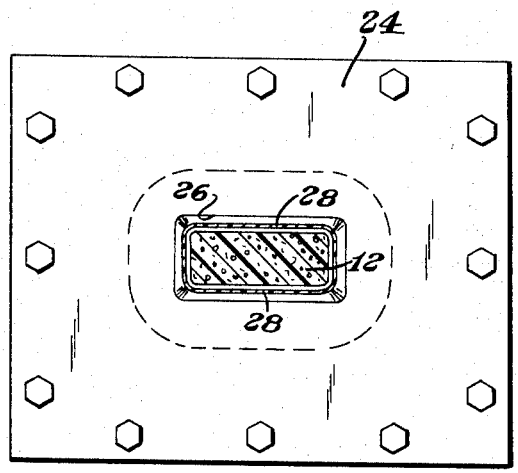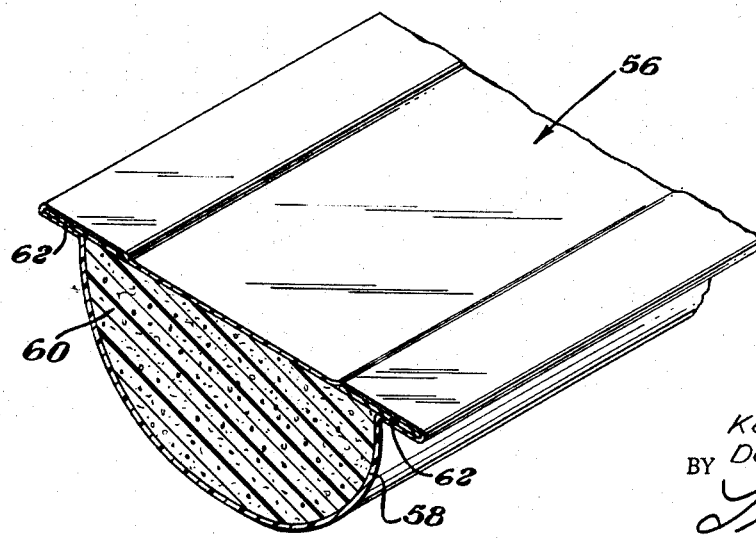

United States Patent Office 3,401,071
Patented Sept. 10, 1968

3,401,071
METHOD FOR PLASTIC FILM ENCAPSULATION
Kenneth J. Cleereman and Donald J. Dirkse, Midland, Mich., assignors to The Dow Chemical Company, Midland, Mich., a corporation of Delaware
Filed Nov. 5, 1962, Ser. No. 235,388
6 Claims. (Cl. 156—244)

This invention relates generally to a method for enveloping an object within a plastic film covering and, more particularly, relates to a method for extruding a plastic film tubing into which a foamed plastic object is fed for encapsulation.

Admittedly, plastic film encapsulation of certain types of objects is well known, i.e. plastic coated wiring as shown in U.S. Patent 2,971,538 issued to R. E. Brumbach on Feb. 14, 1961. However, these prior applications have been successful only because the temperature necessary to encapsulate the plastic film was not so great as to destroy the object encapsulated. That is, the temperature of extruded plastic film covering a metallic wire is generally not so great as to destroy the properties of the wire. The problem is not found to be quite so simple when objects of low melting points are to be encapsulated, such as expanded thermoplastic materials more commonly known as plastic foam. Using such prior techniques of encapsulation only results in a degradation of a plastic foam.

Accordingly, the present invention relates to a novel method for plastic film encapsulation.

Another object of the present invention is the provision of a novel method for the covering of temperature sensitive objects by a plastic film extrusion.

Still another object of the present invention is to provide for the encapsulation of plastic foam by plastic film which gives a tight bond therebetween.

A further object of the present invention is to provide a method for continuous plastic film encapsulation of various shaped plastic foam objects.

Briefly then, the present invention relates to an apparatus employing a novel method for enveloping a temperature fragile object in a plastic film extrusion wherein the employed method comprises feeding of the object into the hot tubing as it is being extruded, drawing a slight vacuum within the tubing, and quenching the laminate as it is formed. If the plastic tubing being extruded and the object to be covered are properly chosen, a thermal bond can be obtained or, otherwise, a tight enough shrink fit can be obtained to provide a sufficient adherence between the plastic film and foam.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, and in which:

FIGURE 3 is an enlarged cross-sectional view taken along reference line 3—3 of FIGURE 1;

FIGURE 4 is an enlarged cross-sectional view taken along reference line 4—4 of FIGURE 1;

FIGURE 5 is an enlarged cross-sectional view taken along reference line 5—5 of FIGURE 1; and FIGURE 6 is an isometric view, partially broken away, of a dock bumper encapsulated according to the principles of the present invention.

Figure 2:
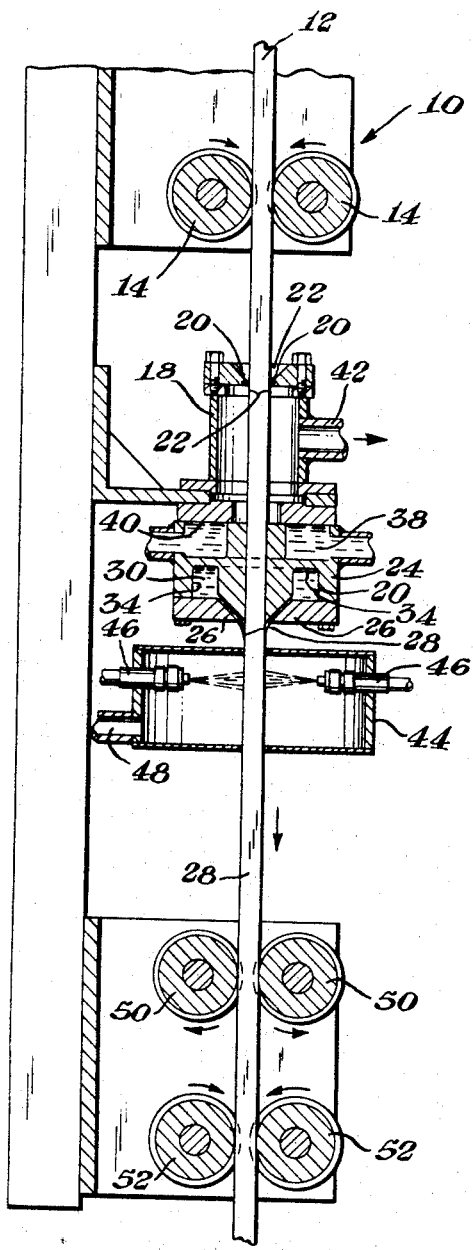
FIGURE 2 is a cross-sectional view taken along reference line 2—2 of FIGURE 1.
Figure 1:
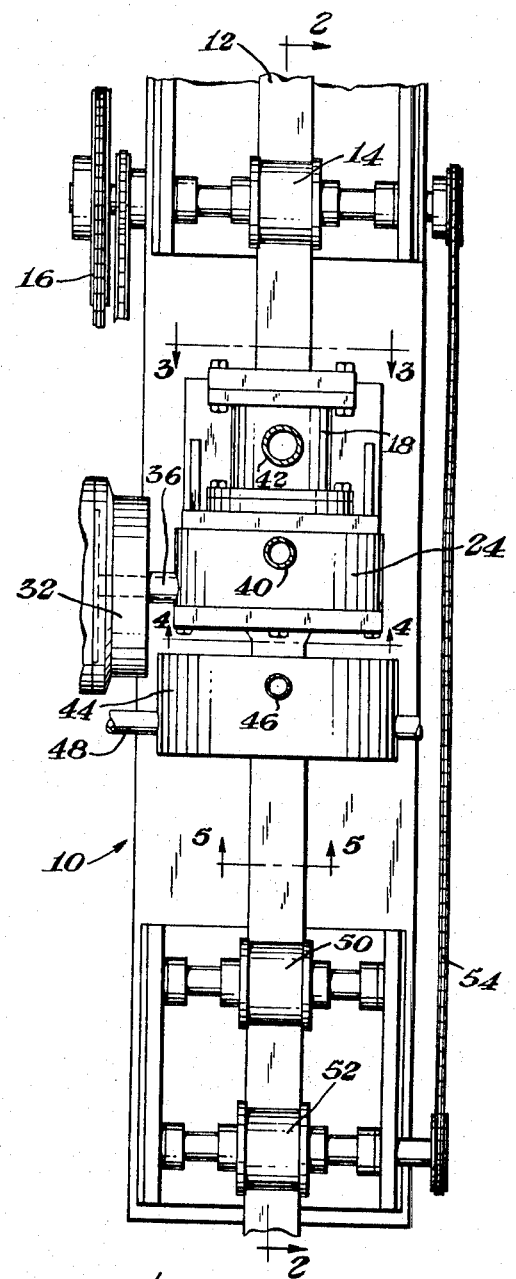
FIGURE 1 is a front elevational view, partially broken away, of apparatus constructed according to the principles of the present invention.

Referring now more particularly to FIGURES 1-5, there is shown apparatus 10, disposed in a generally vertical position, into which a rectangularly shaped plastic foam board-like object or element 12 is shown entering through feed rollers 14 which are driven by a typical chain drive 16 (only parts of which are shown).

Foam object 12 then enters a vacuum chamber 18 passing through lips 20 which serve to seal the foam object with the entry port 22 of chamber 18. Lips 20 are preferably formed of a resilient material such as rubber so as to snugly engage object 12, but it is understood that they can also be formed of harder materials if it does not matter if these materials scrape or otherwise somewhat diminish the cross-sectional dimensions of the object as it enters therebetween. It should be understood here that this apparatus is designed for a continuous operation such that the object 12 is fed as a board stock continuously through the lips 20 as long as it is desired to have encapsulation of foam object 12 take place.

Foam object 12 thence continues to pass into a polymer chamber 24 including extruder die lips 26 which form an encircling extrusion of plastic film 28 about the foam object 12. Polymer 30 enters chamber 24 through an attached extruder 32 which feeds polymer 30 into cavities 34 by way of tube 36, in the traditional manner. Oil bath 38 in a cavity 40 of chamber 24 can be used to give an accurate control of the extruding temperature of the polymer when it reaches the die lips as a plastic film. Oil bath 38 can be cycled through the chamber 24 by any convenient well-known method.

As readily apparent, the die lips 26 form with plastic film 28, as it engages object 12, a seal at the extruding end of chamber 24. Chamber 24 is sealably abutted with chamber 18 which is substantially closed by lips 20 as previously described. Thus, when apparatus 10 is functioning, a continuous sealed compartment comprising chamber 18 and 24 is formed. Chamber 18 includes a vacuum port 42 for the drawing of a vacuum from between the plastic film 28 and foam object 12, as the latter is being encapsulated. Vacuum port 42 thus represents part of a typical vacuum drawing mechanism (not fully shown). The vacuum necessarily draws the plastic film 28 into contact with the plastic foam body 12 as the latter travels through the extruding tubular form of plastic film 28.

In order to complete the lamination in a satisfactory manner, a quenching bath 44 is provided at a location closely adjacent the chamber 24 to prevent destruction of foam cells from the retained heat in the plastic film as it was formed during lamination from chamber 24. Conventional water sprayers 46 can be employed in bath 44, which also includes a drain-off pipe 48 for removing excess water.

Control of the point of contact between the film and the foam is considered important for it has been found that a more effective union can be obtained if the quenching operation takes place at a certain point, generally immediately subsequent to the lamination. Most desirably, if the quench takes place not at, but immediately after the point of contact, the foam can experience some melting first so as to provide a tacky surface for bonding. Thus if the quench takes place at the point of contact, the tacky condition of the foam will not be effected, or if it takes place too long after contact, then the foam is melted too greatly and blistering occurs. By using a tubing die of the proper shape, by controlling the rate of polymer feed and foam feed, and by regulating the vacuum drawn between the sheet and foam, the contact point can be satisfactorily controlled. Additionally, a tighter bond is obtained between the film and the foam by the use of the vacuum.

After encapsulation and lamination is complete, the laminate is removed by take-off rollers 50 and 52, the latter being driven at the same speed as intake rollers 14 because of a connected chain drive 54. Two pairs of rollers, 50 and 52, respectively, are employed at the take-off station in order to insure that the encapsulated foam is not bent at this point.

Another feature of the invention is that if the plastic film being extruded and the object being covered are properly chosen, a thermal bond can be obtained. This is particularly true where the foam object and the film encapsulation material are considered compatible. However, even in incompatible encapsulation, the object to be covered can be surface treated to provide a bond. In many cases the shrinkage of the plastic film over a dissimilar foam or other article is sufficient for an effective encapsulation.

It has been found that the present invention can be used to accomplish the desired result. A specific illustration of another shaped encapsulation product is that of an object having a semicircular cross section, as shown in FIGURE 6, which comprises a dock bumper 56 of plastic foam and which includes a piece of reinforced plastic webbing adhered thereto. A plastic film overlay 58 encapsulates both the plastic foam and the webbing.

Thus, as an illustration, it being understood that this is not limiting, the specific conditions for encapsulating an object such as that illustrated in FIGURE 6 are hereby given.

The body 60 was formed from an expanded polyethylene foam board with webbing 62 being formed of relatively thick 30 mil reinforced polyethylene film, and with a relatively thinner 15 mil polyethylene film being the encapsulating material. The extruder was operated at approximately 370° F. and emitted polyethylene film at the rate of about 37 pounds per hour. The temperature of the die lips was at approximately 400° F. The thickness of the polyethylene film around the polyethylene foam was controlled by the speed of travel of the foam 12, as indicated below. The quench took place ½ inch after the point of contact of the film with the foam. Various satisfactory results were obtained using a vacuum of about 1/10 inch of water, as follows:

| Feet/minute: | Thickness of polyethylene film on foam/inches |
|---|---|
| 2.4 | .029 |
| 8.9 | .011 |
| 15.7 | .006 |

Since the webbing, foam, and encapsulation were of compatible material, a relatively good bond was effected.

It is understood that other compatible plastic materials can be similarly formed, such as polystyrene foam and polystyrene film, polypropylene foam and polypropylene film, and the like. Thus, by using a tubing die with the proper shape, a smooth layer of plastic can be laid over practically any shaped object, whether it be heat sensitive or not, when fed through the tube.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A method for plastic film encapsulation of an object including a temperature frail plastic foam element wherein the temperature of said film is substantially greater than the melting temperature of said foam element, said method comprising the steps of:
   (a) feeding and passing said object into a partially vacuumed chamber and continuously drawing it therethrough,
   (b) extruding a hot plastic film continuously and entirely about said object as it is being withdrawn from said chamber and while drawing a vacuum from between said film and said object, and
   (c) quenching the plastic film encapsulated object immediately subsequent to said encapsulation after the surface of the foam becomes generally tacky and before the foam becomes substantially melted or blistered, whereby lamination of said film with said object occurs without significant degradation of said plastic foam.

2. The method of claim 1 wherein said plastic film and said plastic foam are compatible.

3. The method of claim 2 wherein said film and said foam are formed from polyethylene.

4. The method of claim 1 wherein said quenching occurs approximately one-half inch beyond the point of encapsulation.

5. The method of claim 1 wherein the temperature of said film as it is extruded is approximately 400° F. and rate of drawing said foam through said chamber is within the range of about 2.4 to 15.7 feet per minute.

6. The method of claim 5 wherein the vacuum drawn is about 1/10 inch of water.

References Cited

UNITED STATES PATENTS

| 2,286,922 | 6/1942 | Muller | 18—13 |
| 2,308,638 | 1/1943 | Balthis et al. | 264—174 |
| 2,471,752 | 5/1949 | Ingmanson | 264—174 |
| 3,186,895 | 6/1965 | MacDonald | 156—285 |
| 3,234,065 | 2/1966 | Best | 156—382 |

EARL M. BERGERT, *Primary Examiner.*

T. R. SAVOIE, *Assistant Examiner.*